United States Patent [19]
Schneider

[11] 3,721,483
[45] March 20, 1973

[54] ADJUSTABLE DIAMETER ROLLER BEARING

[75] Inventor: George W. Schneider, Huntingdon Valley, Pa.

[73] Assignee: The Singer Company, New York, N.Y.

[22] Filed: Feb. 15, 1972

[21] Appl. No.: 226,588

[52] U.S. Cl..................................................308/196
[51] Int. Cl..............................................F16c 33/30
[58] Field of Search...............308/196, 189, 207, 208

[56] References Cited

UNITED STATES PATENTS 1,195,952  8/1916  Fox .......................................308/196

Primary Examiner—Charles J. Myhre
Assistant Examiner—Frank Susko
Attorney—Marshall J. Breen et al.

[57] ABSTRACT

An adjustable diameter roller bearing is mounted upon an internal stationary member having an axis of rotation. An external rotor is disposed to rotate about the axis of rotation. In order to reduce the cost of manufacturing the mating parts while holding to the required tolerances, the subject bearing has an adjustable diameter or is radially shiftable. A support means having at least one axially movable ring is carried on the stationary member. A split raceway is mounted upon the support means to be radially shiftable responsive to axial movement of the ring. A roller cage having a plurality of circumferentially spaced rollers is rotatively disposed upon the raceway means. Adjustable positioning means are connected to the support means to axially shift the support means and the raceway to force the rollers concentrically to engage the rotor. The support means are concentric to the axis of rotation, and by engaging the raceway, cause the raceway also to be concentric. Adjusting the diameter of the roller bearing causes the rotor to be likewise centered with respect to the axis of rotation. Wedge means in the form of annular chamfers or arcuate shoulders, are used to expand or contract the diameter of the raceway, while annular garter springs urge the raceway to contact the support means.

24 Claims, 18 Drawing Figures

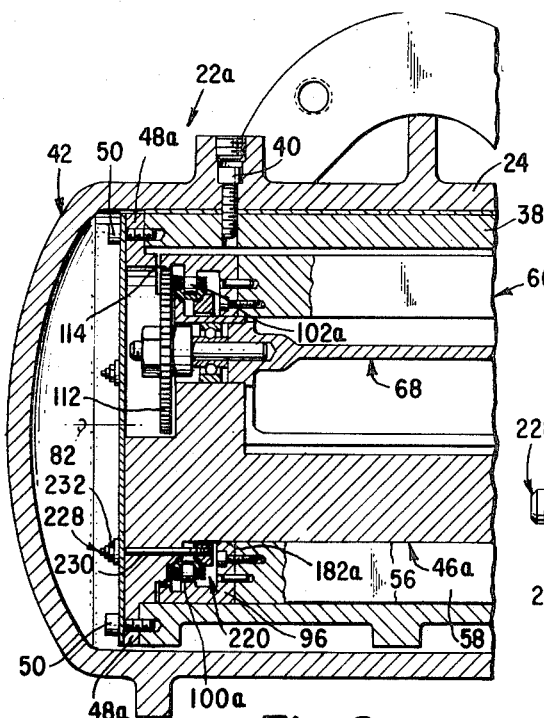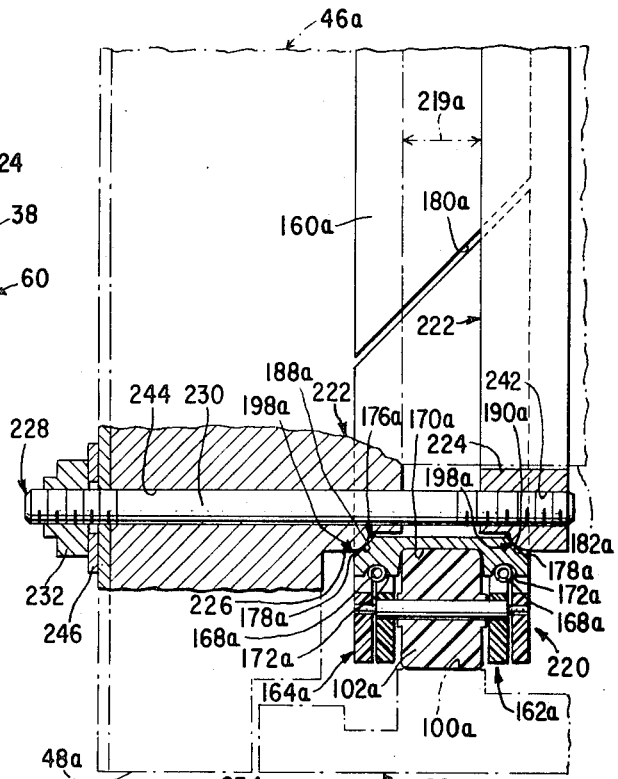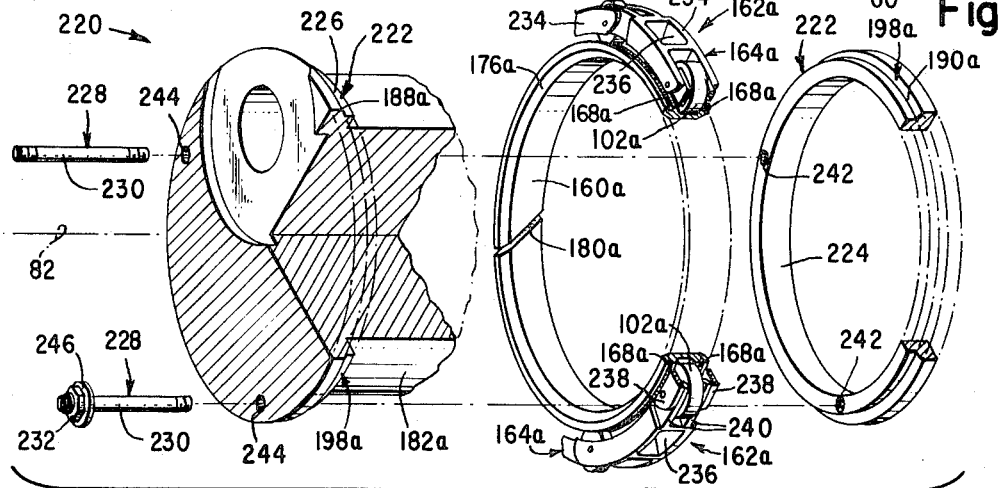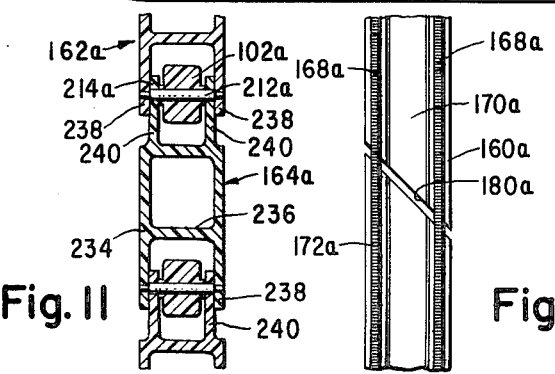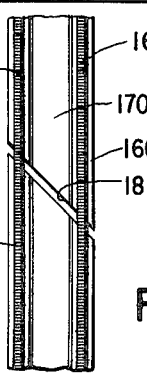

ADJUSTABLE DIAMETER ROLLER BEARING

BACKGROUND OF THE INVENTION

Heretofore, use of a bearing of conventional construction would require precision grinding of the mating parts of the rotor, bearing and stationary member, in order to hold the required tolerances. This increased the manufacturing cost considerably. Bearings having adjustable diameters could not guarantee concentric positioning of the rotor, and were complex, bulky and costly.

SUMMARY OF THE INVENTION

It is therefore an object of the present invention to provide an improved adjustable diameter roller bearing which overcomes the prior art disadvantages; which is simple, economical and reliable; which uses an axially movable support means; which has a split raceway; which maintains concentricity of the rotating parts with an axis of rotation; which has wedge means capable of expanding or contracting the raceway; which uses one or more spaced rings; and, which has positioning means that clamp the raceway between the support members, thus forcing the raceway into a concentric position with respect to the axis of rotation.

Other objects and advantages will be apparent from the following description of several embodiments of the invention, and the novel features will be particularly pointed out hereinafter in the claims.

BRIEF DESCRIPTION OF THE DRAWINGS

This invention is illustrated in the accompanying drawings in which:

FIG. 8 is a partial, sectional, side elevation showing another preferred embodiment of the present invention.

FIG. 9 is a greatly enlarged, broken away view, showing the improved bearing of FIG. 8.

FIG. 10 is an exploded perspective, partly in section, of the improved bearing of FIG. 8.

FIG. 11 is a top plan view, in section, of a portion of the roller cage and rollers.

FIG. 12 is a partial top plan view of the split raceway and springs mounted thereon.

DESCRIPTION OF THE INVENTION

In the embodiment of the invention illustrated in FIGS. 1-7, the novel bearing assembly, designated generally 20, is shown embodied in a positive displacement rotary meter 22. The meter 22 is briefly described herein, but for a more detailed description thereof, reference may be had to U.S. Pat. No. 3,554,032, granted Jan. 12, 1971, and entitled "Rotary Fluid Meter."

Figure 1:
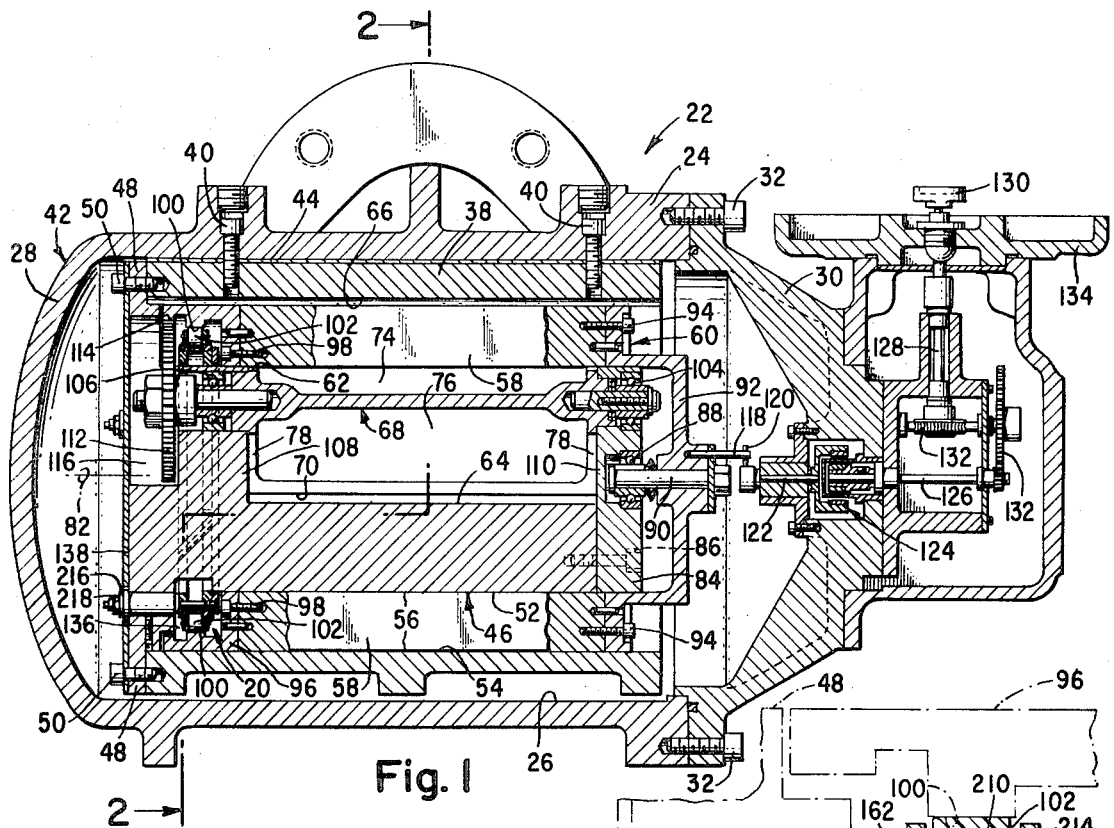
FIG. 1 is a sectional side elevation showing a preferred embodiment of the invention.
Figure 2:
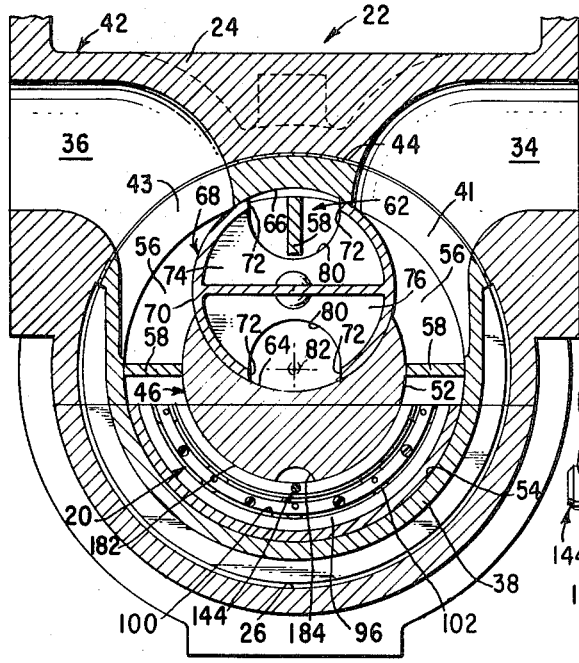
FIG. 2 is a sectional, front elevational view taken substantially along lines 2—2, as shown in FIG. 1.

The meter 22, as shown in FIG. 1, has a stationary housing 24 with a central opening 26. This opening 26 is closed at one end by the integral end member 28, and is closed at the other end by the bonnet 30 attached to the housing 24 by fastenings 32. The housing 24 has an inlet passage 34 and an outlet passage 36 illustrated in FIG. 2. A stationary liner 38 is positioned within the bore 26 and is fixed to the housing 24 by means of the fasteners 40. The housing 24 and the liner 38 are part of the stationary body 42. The liner 38 has an inlet opening or port 41 aligned with the inlet passage 34, and an outlet opening or port 43, aligned with the outlet passage 36, as depicted in FIG. 2. A gasket 44 is clamped between the housing 24 and the liner 38, in the region of the inlet an outlet ports 41 and 43, respectively. A stationary crescent-shaped member 46 is provided with an end flange 48, fixed to the liner 38 by fastenings 50. The member 46 has an outer wall surface 52 shown in FIG. 1 which is concentric with the inner wall surface 54 in the liner 38, and these walls define an arcuate channel 56 between them. The arcuate channel 56 receives the blades 58 of a rotor 60 which is mounted to rotate within the liner 38. An offset cavity 62 within the liner 38 is defined by the concave cylindrical surfaces 64 and 66, and this cavity 62 intercepts the arcuate channel 56. A rotary gate 68 is mounted to turn in the offset cavity 62 and its outer cylindrical surface 70 fits closely within the surfaces 64 and 66. The surface 70 is interrupted to provide entrance openings 72 into separate pockets 74 and 76, formed within the rotary gate 68 as illustrated in FIGS. 1 and 2. The end walls 78 of the rotary gate 68 are cut away, as shown at 80, to provide clearance for the rotor blades 58. The axis of rotation 82 of the rotor 60 intercepts the offset cavity 62 and the path of movement of the rotary gate 68 because the diameter of the rotary gate is greater than one-half the diameter of the rotor 60.

For convenience in assembly, the member 46 includes a stationary plate 84 fixed thereto by fastenings 86. A front bearing assembly 88 is mounted in the plate 84 and supports a trunnion 90 fixed on the end flange 92 of the rotor 60. The rotor blades 58 are secured to this end flange 92 by means of threaded fastenings 94, and depicted in FIG. 1.

Figure 3:
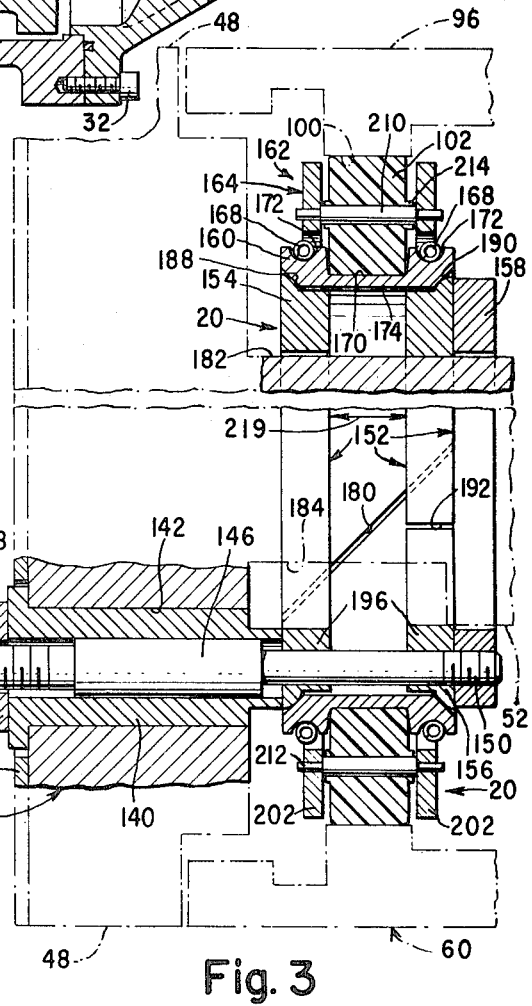
FIG. 3 is a greatly enlarged, broken away side elevational view of the novel bearing of the present invention.

An end ring 96 illustrated in FIG. 1 is secured to the other end of the rotor blades 58 by means of fastenings 98, and the end ring 96 is provided with a circular trackway 100. The trackway 100 is contacted by a plurality of circumferentially spaced rollers 102 of the bearing assembly 20 as illustrated in FIGS. 1, 2 and 3, for purposes more fully described hereinafter. Accordingly, one end of the rotor 60 is supported by means of the trunnion 90 and bearing 88, and the other end is supported by means of the rollers 102 of the bearing assembly 20 and the trackway 100.

The rotary gate 68 is supported on axially spaced bearings 104 and 106. The bearing 104 is carried on the plate 84 and the bearing 106 is carried on the crescent-shaped member 46. The parallel end walls 78 on the rotary gate 68 have running clearance with a stationary wall 108 and surface 110 of the plate 84, respectively. An external spur gear 112 is fixed to the rotary gate 68 and meshes with the internal spur gear 114 provided on the ring 96 of the rotor 60. The gear 112 is mounted within a clearance pocket 116 provided on the member 46. The fixed diameter of the gear 112 is one-half that of the internal gear 114, so that the rotary gate 68 turns at twice the speed of the rotor 60. Thus, the two pockets 74 and 76 in the rotary gate 68 are adequate for successive reception of the four rotor blades 58.

A mechanism for driving a counter or other readout register device is conveniently mounted in the bonnet 30. In the register depicted in FIG. 1, an axially projecting offset pin 118 on the rotor flange 92 engages a radially projecting arm 120, fixed to a shaft 122. A magnetic coupling device 124 connects the shaft 122 to a shaft 126. The shaft 126 drives a shaft 128 and a coupling 130 through a speed reducing gear train 132. A suitable counter mechanism (not shown) is mounted on the bonnet flange 134 and arranged to be driven by the coupling 130.

The trackway 100 and the internal gear 114 form a portion of the outer boundary of an annular space 136 into which the bearing assembly 20 and the gear 112 project. The only openings through which fluid can flow into the annular space 136 are the long labyrinth seals formed by the running clearances between the rotating and stationary parts, since the back opening thereof is closed by means of a cover plate 138. Dirt particles in the fluid stream are thus excluded from the bearings, gears and trackway.

In operation, the housing flanges at the inlet 34 and outlet 36 are connected to suitable piping (not shown). Fluid under pressure is admitted through the inlet passage 34 and opening 41, and into the annular channel 56. Fluid pressure acting on the upstream side of one of the rotor veins 58 (shown at the 3 o'clock position in FIG. 2), causes the rotor 60 to turn within the liner 38 in a clockwise direction. The gearing 112, 114 turns the rotary gate 68 in a clockwise direction at twice the speed. The rotary gate 68 prevents direct flow from the inlet 34 to the outlet 36 and requires the fluid to flow through the annular channel 56. Each of the rotor blades 58 is received in one of the gate pockets 74 or 76 as it passes from a position near the outlet 36 to a position near the inlet 34. Rotation of the rotor 60 is transmitted through the pin 118 and the shaft 122, magnetic coupling 124, and through the gear train 132 to drive the coupling 130. The fluid exits the channel 56 through the port 43 and outlet passage 36 as shown in FIG. 2.

In part, because of the large diameter, it is more critical that the mating parts hold to the required tolerances at the bearing assembly 20, and anywhere else in the meter 22. The embodiment of the present invention illustrated in FIGS. 1–7 is intended for use in retrofitting and otherwise conventional meter 22. A bushing 140 is disposed in an aperture 142 formed in the end flange 48, so as to adapt the existing hole diameter of aperture 142 to a screw 144 having an enlarged body portion 146, intermediate threaded ends 148, and 150 respectively, with the diameter at end 148 slightly larger than that of the end 150 as viewed in FIG. 3.

Figure 4:
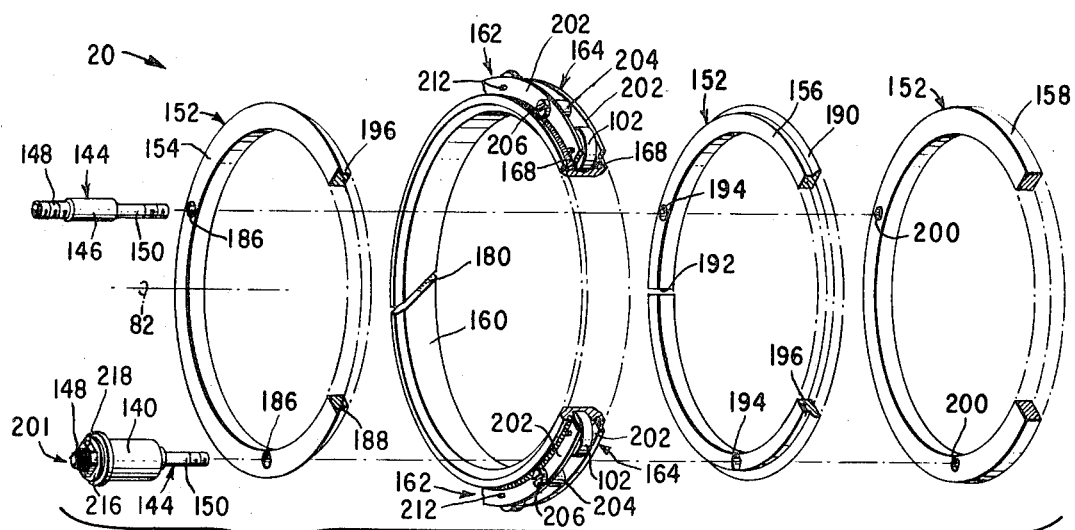
FIG. 4 is an exploded perspective view of the improved bearing of the present invention.

The bearing assembly 20 as best seen in FIGS. 3 and 4, includes a support means 152 having a floating ring 154 axially spaced from a split support ring 156 and a back up ring 158, a split raceway or inner bearing race 160, upon which is rotatively mounted a rotary means 162 having a cage means 164 and a plurality of circumferentially spaced cylindrical rollers 102, with the means 162 disposed in superposition to a pair of axially spaced garter springs 168 which act to radially collapse the raceway 160, and the screws 144, which act as positioning means as more fully explained hereinafter.

Figure 5:
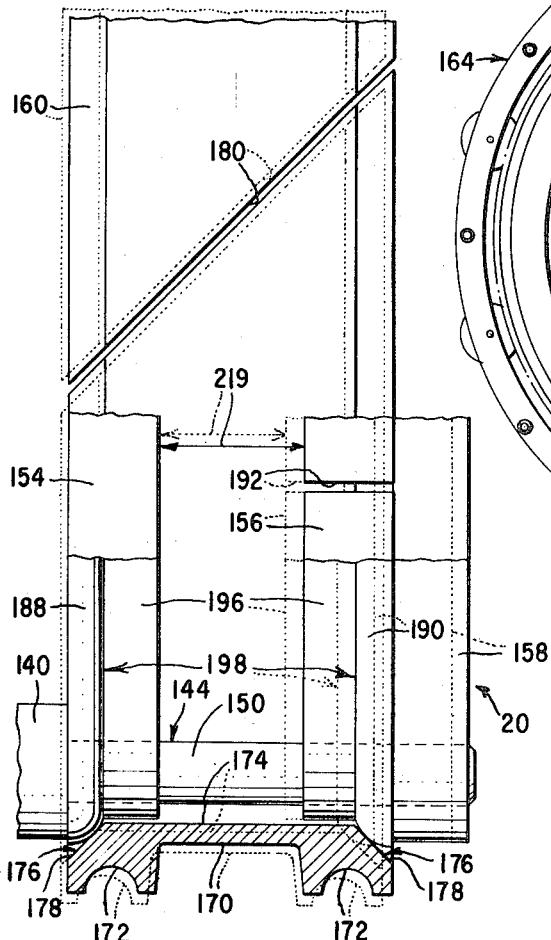
FIG. 5 is a greatly enlarged view, broken away, of the improved bearing of the present invention showing a diagrammatic representation of the axial and radial shifting of the raceway thereof.
Figure 6:
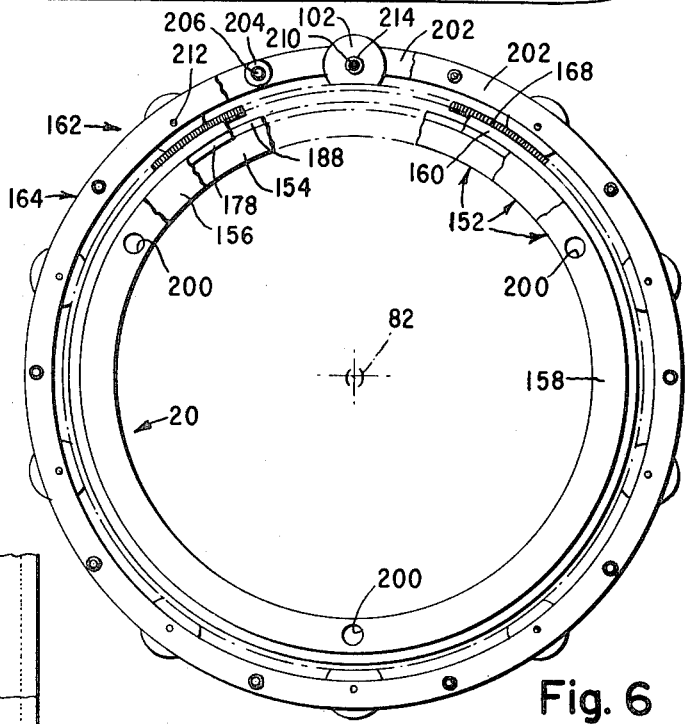
FIG. 6 is a rear elevational view, partly broken away, of the improved bearing of the present invention.
Figure 7:
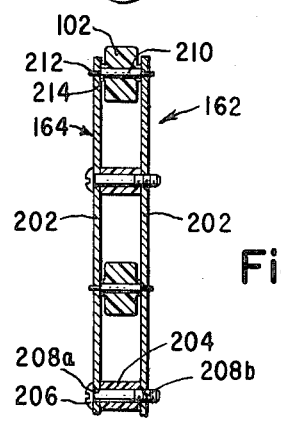
FIG. 7 is a top plan view, partly in section, of the rotary means including the cage means and rollers.

The raceway 160 as seen in FIGS. 3 and 5, has an inner trackway 170 formed on its outer circumference intermediate a pair of axially spaced annular grooves 172. The cylindrical rollers 102 will rotate about the trackway 170, while the springs 168 are disposed in the annular grooves 172. The inner circumference includes a straight intermediate section 174 which lies substantially parallel to the bottom surface of the trackway 170. The opposite ends of the intermediate section 174 terminate in wedge means 176 which take the form of chamfered edges 178 which extend radially upwardly and outwardly in a direction away from each other. The raceway 160 has an oblique or transverse split as at 180, which permits adjustment of the diameter of the raceway 160 by means of expansion or contraction thereof.

Inwardly of the end flange 48, the crescent-shaped member 46 has a circular section 182 which has arcuate recesses 184 radially inwardly of the three screws 144 which are uniformly circumferentially spaced at 120° intervals. The axis of the circular section is coincident to the axis of rotation 82, while the screws 144 are mounted in the end flange 48 at radially equal distance from the axis 82.

The floating ring 154 has an inner diameter slightly larger than the diameter of the circular section 182, and is formed substantially round. A plurality of holes 186 are formed in alignment with the screws 144. An arcuate shoulder 188 is formed on the end of the floating ring 154 adjacent the end flange 48 and extends from an intermediate point on the outer circumference thereof, to form an arcuate surface which extends radially upwardly and outwardly in the direction of the end flange 48. The support ring 156 has a similar arcuate shoulder 190 formed thereon, but extending in the opposite direction away from the end flange 48. The support ring 156 is circular, with a split at 192 and a plurality of holes 194 formed in alignment with the screws 144. Each of the rings 154, 156 has a flat annular section 196 which are axially spaced as at 219 from each other and are disposed in face to face relationship. The sections 196 have a smaller outer diameter than that of the highest point on the respective shoulders 188 and 190. The shoulders 188 and 190 coact to define wedge means 198, formed for purposes more fully described hereinafter. The annular back up ring 158 has an inner diameter slightly larger than the diameter of the circular section 182. A plurality of tapped holes 200 are formed in the ring 158 in alignment with the screws 144. The end 150 of the screws 144 will pass through the holes 186 and 194 to be threadedly engaged in the tapped holes 200, so as to position the raceway 160 between the rings 154 and 156, as shown in FIGS. 3 and 5.

The cage means 164 illustrated in FIGS. 3, 4, 6 and 7, have a pair of annular retaining rings 202, which are axially spaced by a spacer 204 held in position by a screw 206 passing through holes 208a and 208b, the latter of which is tapped, so as to hold the cage means 164 in assembled position. The roller 102 is mounted on the enlarged center portion 210 of a pin or axle 212 with the roller 102 free to rotate relative thereto. The roller 102 has integral spacers 214 formed at either end thereof, of greatly reduced diameter so as to prevent binding of the roller 102 against the retainer rings 202. The connection between the rollers 102, the pins 212, and the retainer rings 202, is sufficiently loose to permit the designed amount of diameter adjustment of the raceway 160. The retainer rings 202 have a diameter sufficiently large so as to permit the rollers 102 to be seated within the inner trackway 170 of the raceway 160, while providing for the desired amount of expansion or contraction of the raceway 160.

In the bearing assembly 20, as illustrated in FIG. 3, the retainer rings 202 are disposed radially outwardly of the springs 168 which urge the raceway 160 to collapse into contact with the rings 154 and 156 of the support means 152.

The present embodiment of the invention can be used for retrofitting an otherwise conventional meter 22 with the novel bearing assembly 20. In this form, and because of manufacturing tolerances on both the bearing track on the circular section 182 of the member 46 and the trackway 100 of the rotor 60, it is necessary to adjust both the outside diameter of the raceway 160 and the inside diameter of the support ring 156, each of which are split, as at 180 and 192, respectively.

Since the support ring 156 is split at 192, the spring bias of the annular garter spring 168 acts through the raceway 160 to clamp the support ring 156 upon the circular section 182 of the stationary member 46, and thereby holds the raceway 160 concentric to the axis of rotation 82 in like manner to the concentric position of the support ring 156 and the circular section 182. The floating ring 154 is perfectly round and contact between the arcuate shoulder 188 thereof and the chamfered edge 178 of the raceway 160 will act to hold the raceway 160 to a perfectly round condition.

Adjustment of the diameter of the bearing assembly 20 is made via the adjusting screws 144 at the outer threaded end 148 thereof, which extends beyond the bushing 140 and is fitted with a washer 216 and a nut 218. Rotation of the nut in one direction or the other will control the axial position of the back up ring 158 which also repositions the support ring 156, and due to the wedging action of the arcuate shoulders 188 and 190, respectively, on the chamfered edge 178 at either side of the raceway 160, the diameter of the raceway 160 will be either expanded or contracted.

The initial mounting of the bearing assembly 20 will place the floating ring 154 in abutment with the end flange 48 and bushings 140, which position may be considered as axially fixed in that the floating ring 154 will not shift or change axial position during adjustment of the bearing assembly 20. The opposite ends of the intermediate section 174 terminate in wedge means 176 which take the form of chamfered edges 178 which extend radially upwardly and outwardly in a direction away from each other.

The raceway 160 has an oblique or transverse split as at 180, which permits adjustment of the diameter of the raceway 160 by means of expansion or contraction thereof. In FIG. 5, the raceway 160 is illustrated as being supported upon the shoulders 188 and 190 in a first position in the full line representation wherein the support rings 154 and 156 are axially spaced from each other by a certain distance described generally by the reference character 219. The rotary means 162 and the garter springs 168 are not shown in the diagrammatic representation of FIG. 5. Assuming the diameter adjustment to be made requires expansion of the raceway 160, upon adjustment by the positioning means 201, made up of the screws 144 and nuts 218, the support ring 156 and the raceway 160 will assume an adjusted position represented by the dotted lines of FIG. 5 wherein the support ring 156 is shifted axially toward the ring 154 to lessen the space 219, while the raceway 160 is shifted both axially toward ring 154 and radially outwardly therefrom. This is the same movement which the support ring 156 and raceway 160 will partake in respective assembled position in the bearing assembly 20 when the diameter of the raceway 160 requires expansion.

In the other preferred embodiment of the invention illustrated in FIGS. 8–18, the novel bearing assembly, designated generally 220, is shown embodied in a positive displacement rotary meter 22a. The meter 22a is substantially the same as meter 22, and for the most part, like parts and components will have similar reference characters for both embodiments of the present invention, except, mainly as relates to the bearing assembly 220, wherein certain components will use their counterparts reference character having a suffix "a," while other components, again mainly related to the bearing assembly 220 will be referred to by a new reference character.

Accordingly, the meter 22a has a stationary housing 24 having an inlet and outlet passage (not shown) for fluid to flow into the meter 22a and be measured by rotation of the rotor 60 within the channel 56 from inlet to outlet as divided by the rotary gate 68. The rotor 60 has a plurality of blades 58 interacting with the rotary gate 68 in timed relation through gears 112 and 114, respectively.

The housing 24 has a stationary liner 38 fixed thereto, and a stationary crescent-shaped member 46a having an end flange 48a fixed to the liner 38 by fastenings 50. The stationary body 42 is defined by the housing 24 and liner 38 and other stationary parts affixed thereto. The rotor 60 has an end ring 96 affixed to the end of the blades 58. The end ring 96 has an inner circular trackway 100a. A further description of the structure and operation of meter 22a may be had by reference to that set forth hereinbefore under the meter 22.

The bearing assembly 220 as best seen in FIGS. 9 and 10, includes a support means 222 having an axially adjustable support ring 224 and support ring 226 axially fixed and formed integrally with the end flange 48a, a split raceway or inner bearing race 160a, upon which is rotatively mounted a rotary means 162a having a cage means 164a and a plurality of circumferentially spaced cylindrical rollers 102a, a pair of axially spaced garter springs 168a which act to radially collapse the raceway 160a, and positioning means 228 in the form of screws 230 and nuts 232, which act to assemble and adjust the bearing assembly 220. The bearing assembly 220 is mounted on a circular section 182a of the member 46a formed inwardly of the end flange 48a thereof, and will rotatively support and center one end of the rotor 60.

The rotary means 162a has a plurality of cylindrical rollers 102a supported within the inner trackway 170a of the split raceway 160a. The rollers 102a in turn support and concentrically position the rotor 60 by contact on the outer circular trackway 100a. The outer trackway 100a is a flat cylindrical surface machined on the inside diameter of the end ring 96 of the rotor 60.

The cage means 164a illustrated in FIGS. 10 and 11 include a plurality of links 234 having a slight longitudinal curvature and a hollow central portion 236 from one side of which extends a pair of arms 238 of the same width as the central portion, and the other side of which extends a pair of arms 240, each formed inwardly of the edge so as to be of smaller width than the arms 238, so as to fit within the arms 238 of the adjacent link 234. A pin or axle 212a journals the rollers 102a and interconnects adjacent links 234 at the overlapping arms 238 and 240 thereof. The roller 102a has integral spacers 214a formed on either side thereof adjacent the arms 240, so as to prevent binding or interference with the rotary motion of the rollers 102a. The interconnection between the links 234, rollers 102a and axles 212a, is sufficiently loose to permit adjustment of the diameter of the raceway 160a.

The raceway 160a has two chamfered surfaces 178a machined at each end of the inside diameter thereof, which chamfered surfaces define a wedge means 176a. The raceway 160a is supported via contact of the chamfered surfaces 178a with a curved shoulder 188a and 190a, which shoulders are machined on the support ring 226 and 224, respectively. The curved shoulders 188a and 190a define a wedge means 198a. It will be understood that the specific shapes and form of the wedge means of either of the embodiments, as for example, wedge means 176a and 198a could be changed, or reversed, or modified to another configuration, so long as the result produced the desired coaction and wedging action between the support means and the raceway to adjust the diameter of the latter.

The raceway 160a is obliquely or transversely split as at 180a, so that the raceway 160a is free to expand or contract in diameter as desired. The split 180a is formed at an angle to the center line of the raceway 160a to permit smooth operation of the load-carrying rollers 102a over said split because a portion of the roller line of contact is always supported by the inner trackway 170a on either side of the said split.

The two garter springs 168a are disposed in annular grooves 172a formed on the outer diameter of the raceway 160a on either side of the inner trackway 170a. The garter springs 168a tend to collapse the diameter of the raceway 160a, thus, securely to clamp the chamfered surfaces 178a upon the round shoulders 188a and 190a respectively of the rings 226 and 224. The axes of the circular section 182a and the ring 226a, each formed integrally on the member 46a, are concident to the axis of rotation 82. Also, by manufacture, the round support shoulder 188a of the support ring 226 is concentric to and circular in reference to the axis of rotation 82. Accordingly, raceway 160a will also assume a similar circular and concentric relationship with the axis of rotation 82 through the engagement between the round annular shoulder 188a and the wedge surface 178a.

The support ring 224 is axially adjustable and free to float on the circular section 182a, and is positioned thereon by the three adjusting screws 230 threadedly engaged in the tapped holes 242, as shown in FIGS. 9 and 10. The support ring 224 is centered in reference to the raceway 160a by contact of the round shoulder 190a with the chamfered surface 178a of the raceway 160a. Since the round shoulder 190a is machined perfectly round, it will likewise maintain the split raceway 160a in a round condition due to the clamping action of the garter spring 168a.

Figure 13:
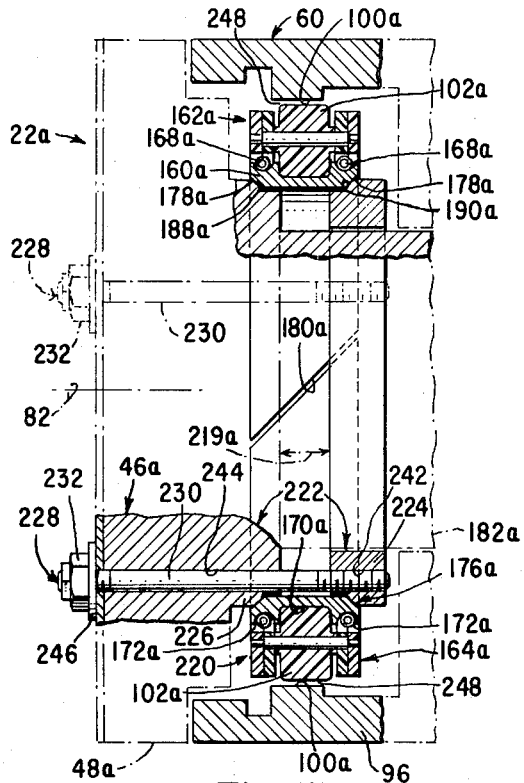
FIG. 13 is an enlarged, broken away, and sectional side elevational view of the improved bearing, showing the bearing in unadjusted, non-concentric position.

The bearing assembly 220 as illustrated in FIG. 13, initially is mounted in the meter 22a by passing the screws 230 through holes 244 formed in the member 46a at the end thereof adjacent the end flange 48a and support ring 226. The screws are threadedly received in the tapped holes 242 of the support ring 224, so as to position the raceway 160a and rotary means 162a upon the support means 222. The end of the screw 230 extends beyond the end flange 48a and is threaded. A washer 246 is disposed on the free end of screw 230 which then threadedly receives the nut 232 thereon. In the initial assembly position, the bearing assembly 220 has the raceway 160a in unadjusted position and for purposes of FIGS. 13 and 17, it is assumed that the rotor 60 is in non-concentric position with respect to the axis of rotation 82. FIGS. 13 through 18 illustrate a diagrammatic representation which assumes that the adjustment necessary on the diameter of the raceway 160a requires radial expansion thereof, but of course, the same principles of the invention would apply had a radial reduction in said diameter been required to center the rotor 60. FIG. 13 indicates a clearance space 248 exists between the roller 102a and the outer trackway 100a so as to require adjustment of the diameter of the raceway 160a of the bearing assembly 220. Of course, whether the clearance space 248 existed or not, if the rotor is in non-concentric position represented by FIG. 17, the bearing assembly 220 would require adjustment so as to center the same and the rotor 60 with respect to the axis of rotation 82 so as to place the rotary and stationary parts in concentric relationship to the axis of rotation 82.

Figure 15:
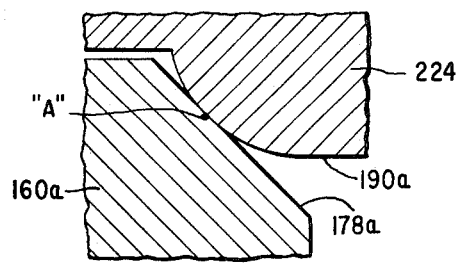
FIG. 15 is a greatly enlarged partial, sectional, side elevational view of the wedge means corresponding to FIG. 13.
Figure 17:
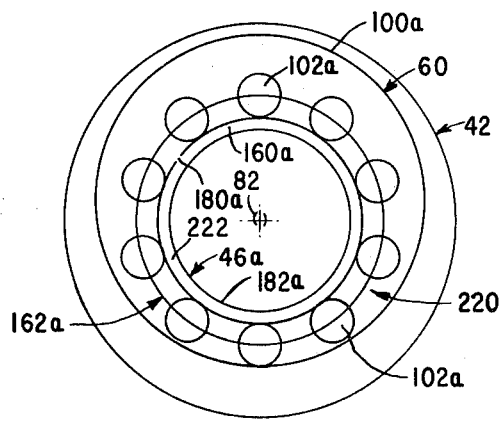
FIG. 17 is a view of the improved bearing corresponding to FIG. 13, showing a diagrammatic representation of the bearing in unadjusted, non-concentric position.

Accordingly, adjustment of the diameter of the raceway 160a is made by turning the lock nuts 232 on the adjusting screws 230. When the nuts 230 are turned so that the horizontal gap 219a between the support rings 224 and 226 is reduced, the diameter of the raceway 160a is increased due to the wedge action of the round support shoulders 188a and 190a on the respective chamfered surfaces 178a of the raceway 160a. In FIG. 15, the contact point of the chamfered surface 178a of the raceway 160a with the shoulder 190a is indicated at the point designated by the reference character "A." The contact point "A" of the chamfered surface 178a illustrated in FIG. 15 corresponds to its respective position shown in FIG. 13. In such an unadjusted position, the rotor 60 is depicted in FIG. 17 as being in non-concentric position.

Figure 14:
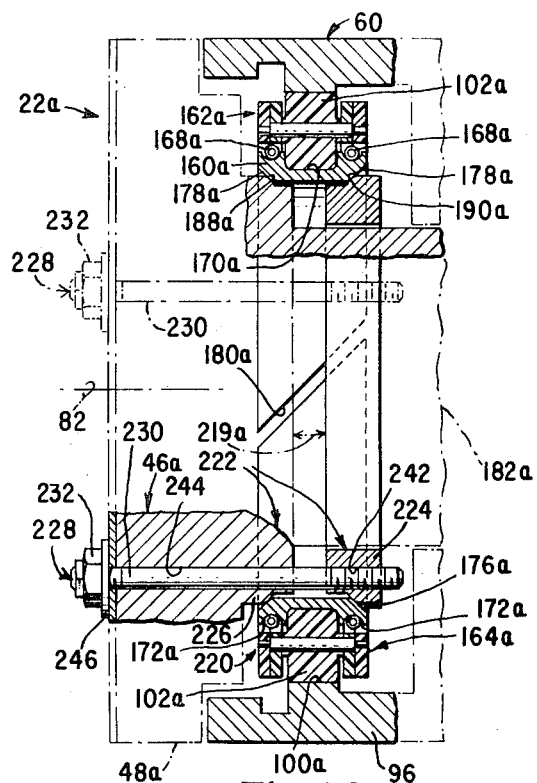
FIG. 14 is a broken away, sectional, side elevational view of the improved bearing in adjusted, assembled concentric position.
Figure 16:
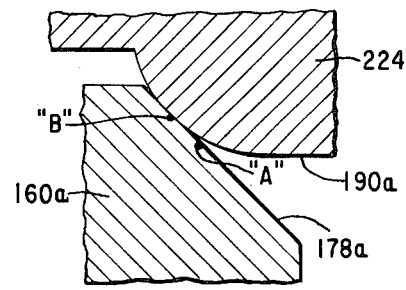
FIG. 16 is a partial, sectional, side elevational view of the wedge means corresponding to FIG. 14.
Figure 18:
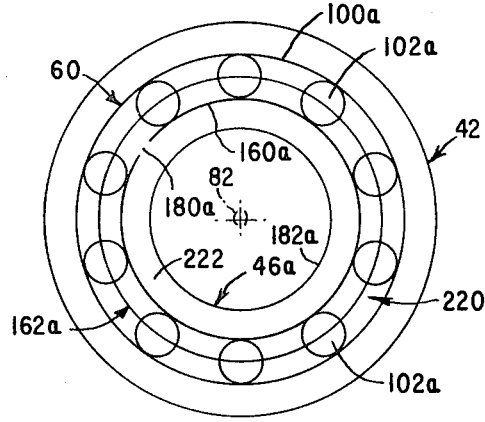
FIG. 18 is a view corresponding to FIG. 14, showing the improved bearing in adjusted, concentric position.

After adjustment of the diameter of the raceway 160a by expanding the same as depicted in FIG. 14, the point "A" located on the chamfered surface 178a is no longer in contact with the rounded shoulder 190a, but rather, the raceway 160a has been forced to expand because of the wedging action of the axially spaced rounded shoulders 188a and 190a to bring the rounded shoulder 190a into contact with a new point designated generally by the reference character "B." Though only the rounded shoulder 190a has been shown in FIGS. 15 and 16, it will be understood that a mirror image of FIGS. 15 and 16 would represent rounded shoulder 188a, so as to produce the same result. The bearing assembly 220 is shown in adjusted concentric position in FIGS. 14 and 18, whereby the diameter of the raceway 160a has been expanded as is indicated by the increased clearance in the split 180a and the fact that the rollers 102 are in contact with the outer trackway 100a, so as to eliminate the clearance 248 therebetween. Furthermore, as indicated in FIG. 18, the rotor 60 has been forced into concentric position with respect to the axis of rotation 82 by the adjustment of the bearing assembly 220.

Likewise, adjustment of the bearing assembly 220 can be had in certain instances which require reduction of the diameter of the raceway 160a by turning the adjusting nuts 232 in a direction to increase the gap 219a between the rings 224 and 226.

While a great range of materials may be utilized in the bearing assemblies 20 and 220, tests of said bearing assemblies have indicated that the use of dissimilar materials for the rollers 102 and 102a respectively, and the raceway 160 and 160a respectively, said bearing assembly can be constructed which will not require lubrication. In one particular application, it has been found that plastic rollers and a hard anodized aluminum raceway are satisfactory for operation at moderate speeds of 1,400 r.p.m. and the fairly light loads encountered in rotary meter design.

It will be understood that various changes in the details, materials, arrangements of parts and operating conditions which have been herein described and illustrated in order to explain the nature of the invention may be made by those skilled in the art within the principles and scope of the invention.

Having thus set forth the nature of the invention, what is claimed herein is:

1. A bearing for a machine having a stationary housing with a fixed axis about which axis a rotating member rotates comprising:
   a. a support means including an axially movable ring means,
   b. a split raceway mounted upon the support means to be radially shiftable responsive to axial movement of the ring means,
   c. rotary means engaging the raceway and adapted to be rotated thereabout, and
   d. connecting means adjustably affixed to the stationary housing to engage the support means to cause the raceway radially to shift and engage the rotating member.

2. The combination claimed in claim 1 wherein:
   a. the raceway has an oblique split with respect to the axis.

3. The combination claimed in claim 1 wherein:
   a. wedge means is formed on the support means,
   b. wedge means is formed on the raceway to coact with the wedge means of a support means, and
   c. annular spring means mounted upon the raceway to collapse the raceway and urge the wedge means of the raceway into contact with the wedge means of the support means.

4. The combination claimed in claim 3 wherein:
   a. the stationary housing extends within the rotating member,
   b. the support means includes a pair of spaced rings, one being axially movable with respect to the other, and
   c. the spring means includes a pair of annular springs mounted upon the raceway in superposition to each of the wedge means of the rings to provide continuous contact therebetween.

5. The combination claimed in claim 4 wherein:
   a. the wedge means of the raceway define a chamfered surface,
   b. the wedge means of the rings define an arcuate shoulder, and
   c. the connecting means includes three axially disposed screw means, the adjustment of which will shift the annular point contact between the chamfered surface and the arcuate shoulder to force the raceway to expand or to permit the raceway to contract.

6. A machine comprising:
   a. a stationary means having an axis of rotation,
   b. a rotating member adapted to be rotated with respect to the stationary means about the axis of rotation,
   c. the stationary means including a pair of support members, at least one of which is axially shiftable,
   d. annular wedge means formed on at least one of the support members,
   e. the wedge means has an axis coincident to the axis of rotation,
   f. a raceway means, having an adjustable diameter and at least one annular wedge surface means, is mounted on the support means,
   g. the wedge surface means of the raceway means to coact with the wedge means of the support member,
   h. a rotary means is rotatively disposed upon the raceway means, and i. adjustable positioning means connected to the support means to axially shift the same and cause engagement between the wedge surface means and the wedge means radially to shift the raceway means to force the rotary means against the rotating member.

7. The combination claimed in claim 6 wherein:
a. the raceway means has a transverse axial opening thereacross permitting expansion or contraction of the diameter thereof, and
b. a spring means carried by the raceway means to urge the raceway to assume a contracted diameter.

8. The combination claimed in claim 7 wherein:
a. the spring means disposed above the wedge surface means to urge the raceway means against the wedge means of the support member.

9. The combination claimed in claim 8 wherein:
a. the wedge means of the support member is formed circularly, and
b. the spring means is annular and urges the raceway means into annular point contact with the wedge means, whereby the raceway assumes a circular shape corresponding to that of the wedge means.

10. The combination claimed in claim 9 wherein:
a. the wedge means has an axis coincident to the axis of the stationary means, and
b. the positioning means equidistantly spaced about the axis to urge axial movement of the support member in a plane perpendicular to the axis to force the axis of the raceway to correspond to the axis of the wedge means in coincident position to the axis of the stationary means.

11. An adjustable diameter bearing to be mounted about an axis of rotation comprising:
a. a pair of support members,
b. a split raceway mounted upon the support members,
c. wedge means formed on the support members,
d. wedge means formed on the raceway,
e. spring means disposed about the raceway to urge the wedge means of the raceway into engagement with the wedge means of the support members,
f. positioning means interconnecting the support members in an axially adjustable position with respect to one another, whereby axially positioning of the support means results in radially shifting the raceway, and
g. rotary means rotatively mounted about the raceway.

12. The combination claimed in claim 11 wherein:
a. the support members are axially spaced from each other with the wedge means thereof facing each other,
b. one of the support members axially moveable towards or away from the other support member, and
c. the wedge means of the raceway formed on either side thereof to contact the wedge means of the support members.

13. The combination claimed in claim 12 wherein:
a. the wedge means of the support members are formed to contact the wedge means of the raceway at radial points equally spaced from the axis of rotation to center the raceway with respect to the axis of rotation.

14. The combination claimed in claim 13 wherein:
a. the wedge means of the support members are formed annularly with the axes thereof coincident to the axis of rotation, and
b. the positioning means to clamp the raceway between the support members to force the raceway into a concentric position with respect to the axis of rotation.

15. The combination claimed in claim 11 wherein:
a. the rotary means includes an annular cage having a plurality of rollers rotatively mounted therein and circumferentially spaced from each other.

16. The combination claimed in claim 15 wherein:
a. the annular cage includes a plurality of interconnected links, and
b. the links loosely connected to each other to permit expansion and contraction of the raceway.

17. The combination claimed in claim 16 wherein:
a. an axle interconnecting successive links to each other and to one of the rollers to form an endless cage means.

18. The combination claimed in claim 17 wherein:
a. the axles, the links and the rollers are formed in equal numbers into the cage means.

19. A bearing for a machine having a stationary member with a fixed axis about which axis a rotating member rotates comprising:
a. a support means including an axially movable circular ring means,
b. a split raceway mounted upon the support means to be radially shiftable responsive to axial movement of the ring means,
c. rotary means engaging the raceway and adapted to be rotated thereabout, and
d. positioning means adjustably affixed to the stationary housing to engage the support means to effect axial centering of the ring means and the raceway with respect to the axis of rotation, and to cause the raceway radially to shift and to force the rotary means concentrically to engage the rotating member.

20. The combination claimed in claim 19 wherein:
a. the support ring is split,
b. spring means disposed on the raceway to collapse the same and the split support ring to bring the ring into centered contact upon the station member.

21. The combination claimed in claim 19 wherein:
a. the support means include a pair of support members, one of which is axially stationary and one of which is axially movable, and
b. one of the support members is supported by the positioning means in nonsupported radial contact with the stationary member.

22. The combination claimed in claim 19 wherein:
a. wedge means formed on the support means,
b. the wedge means to engage the raceway and responsive to movement of the positioning means to expand or contract the diameter of the raceway.

23. The combination claimed in claim 19 wherein:
a. spring means mounted upon the raceway to collapse the same to bring the raceway into annular contact with the support ring.

24. The combination claimed in claim 23 wherein:
a. the positioning means to urge the support ring and the raceway to be in axial contact with each other,
b. wedge means formed on the support ring and the raceway to interact therebetween, c. the wedge means responsive to axial shifting of the support ring to cause radial shifting of the raceway.

* * * * *